United States Patent [19]

Bugnone

[11] 4,222,512
[45] Sep. 16, 1980

[54] DEVICE FOR CONTROLLING ROTARY MOTION

[76] Inventor: Aldo Bugnone, Via Bellini 2, Turin, Italy

[21] Appl. No.: 912,158

[22] Filed: Jun. 2, 1978

[30] Foreign Application Priority Data

Jun. 2, 1977 [IT] Italy ............................. 68267 A/77

[51] Int. Cl.³ .................... B65H 17/20; B65H 19/10; B65H 19/22
[52] U.S. Cl. .................................. 226/181; 226/188; 226/190; 242/55; 242/58.2; 242/64; 318/5; 318/45; 318/49; 318/102
[58] Field of Search .................... 242/58.1, 58.2, 58.3, 242/58.4, 75.51, 75.5, 55, 54 R, 64; 318/5, 8, 39, 45, 49, 46, 47, 113, 102, 67, 62; 226/181, 188, 190, 168

[56] References Cited

U.S. PATENT DOCUMENTS

| 1,993,579 | 3/1935 | Wright | 318/47 X |
|---|---|---|---|
| 2,674,706 | 4/1954 | Knosp et al. | 318/46 |
| 3,194,508 | 7/1965 | Netze | 242/58.3 |
| 3,427,519 | 2/1969 | Louis | 318/593 |
| 3,940,677 | 2/1976 | Morino et al. | 318/46 |
| 3,944,902 | 3/1976 | Lacorre et al. | 318/593 |

Primary Examiner—George F. Mautz
Attorney, Agent, or Firm—Sughrue, Rothwell, Mion, Zinn & Macpeak

[57] ABSTRACT

A rotary drive device for effecting, for example, displacement of a printing roller towards or away from a pressure roller in a printing press, is formed by a direct current or alternating current high speed motor coupled mechanically to a permanent magnet low speed motor. Fast movement is effected with the permanent magnet motor being pulled by the high speed motor, while slow movement with rapid braking is effected, at high torque, with the permanent magnet motor excited and pulling the other motor, to bring the printing roller gently into contact with the pressure roller.

3 Claims, 4 Drawing Figures

DEVICE FOR CONTROLLING ROTARY MOTION

The present invention relates to a device for controlling rotary motion, with means for commuting from a high to a low speed of rotation and vice-versa.

A device of this type is used, among others, in printing machines, for example to lift a carriage with a printing roller against a pressure roller. The lifting of the carriage takes place in two stages, the first stage being at high speed, followed by an approach at a lower speed to bring the printing roller into contact with the pressure roller.

To perform these operations in the traditional way a direct current motor is used having an electronic control circuit for the purpose of giving a wide range of variation of rotational speed. Such a motor and control circuit is quite expensive and furthermore at low rotational speeds a normal direct current motor does not provide sufficient torque, so that the motor must have a sufficient size to maintain a high torque even at low rotational speeds.

A further disadvantage is the fact that the motor is self-braking and is not able to stop with precision at a given point.

An object of the present invention is to provide a device of the aforesaid type for controlling rotary motion and for commuting from a fast to a slow movement with efficient braking, and to continue slow movement at high torque, stopping precisely at a required point. A further object of the invention is to provide a device as aforesaid of reduced size and low cost.

According to the invention there is provided a device for controlling rotary motion, including means for commuting from a high to a low rotational speed and vice versa, wherein said device includes an alternating or direct current relatively high speed motor, a permanent magnet relatively low speed motor, and means mechanically coupling said motors to each other.

The control device of the invention, having two motors, which can be coupled coaxially or with their axes parallel, would be less expensive and have a better performance than traditional control devices. During the fast movement by means of the high speed motor the permanent magnet motor (stepping motor) is pulled by the high speed motor; upon commuting from fast movement to slow movement the permanent magnet motor effects gentle but rapid braking followed by slow movement, while still at high torque, and is able to stop precisely without shock.

The device according to the invention can advantageously be applied in web-handling machines such as rotary printing presses and painting machines, and laminating machines and the like. For example the device may be used for lifting a drive roller towards a counter-pressure roller, or for displacement of a winding or unwinding element, or for controlling the rotation of arms carrying bobbins in a winding or unwinding machine.

The invention will be further described, by way of non-limiting example, with reference to the accompanying drawings, wherein.

Figure 1:
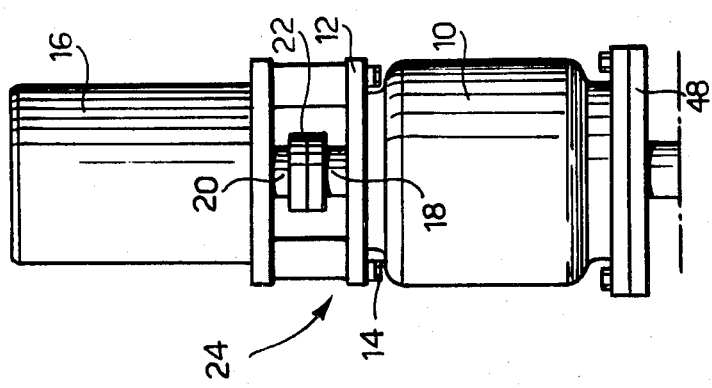
FIG. 1 is a frontal view of a device according to one embodiment of the invention.

In FIG. 1 a direct current or alternating current electric motor 10 is shown having a high rotational speed, for example 3000 revolutions per minute. The motor 10 has a rotary mounting flange 12 to which a superimposed permanent magnet motor 16 (stepping motor) is fixed by means of bolts 14, for example a motor of the "Slo-syn" type which rotates at a low rotational speed, for example 60 revolutions per minute. The shaft 18 of the motor 10 is coaxial with the shaft 20 of the motor 16, the motor shafts 18 and 20 being coupled together by means of a mechanical coupling 22.

Figure 2:
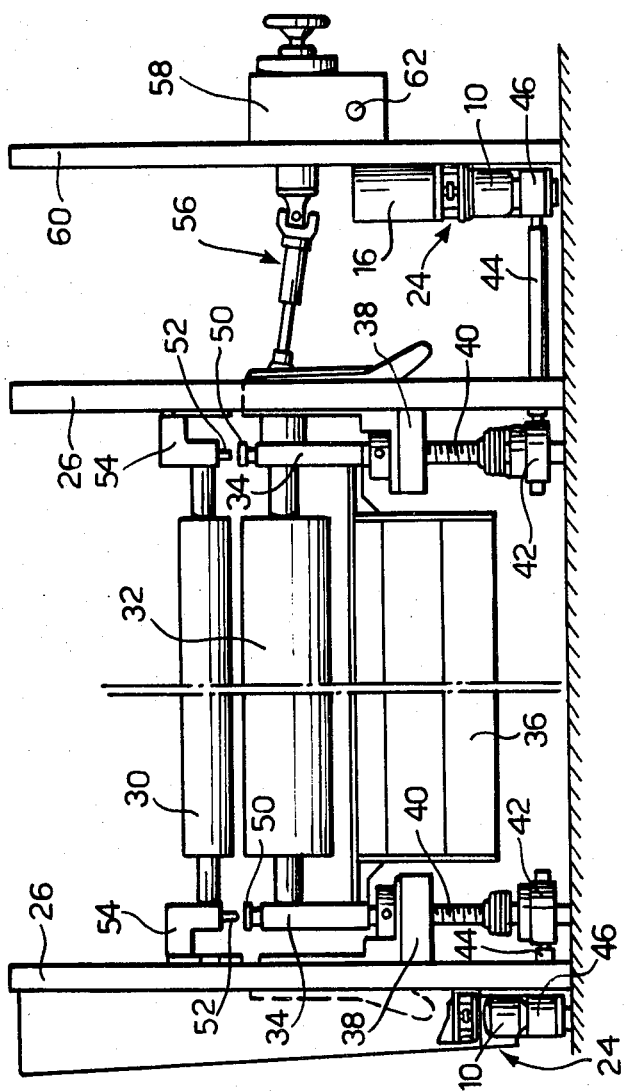
FIG. 2 is a schematic front elevational view of a roller stage in a rotary printing machine, provided with the device of FIG. 1, shown on a reduced scale.

The operation of the device 24 comprising the two coupled motors 10 and 16 will now be explained with reference to FIG. 2. From this Figure it will be seen that between two vertical supports 26 in one stage of a rotary printing machine or the like (FIG. 3) a counter-pressure roller 30 is mounted for rotation about a fixed axis. Beneath the roller 30 there is a drive roller 32, which in the illustrated example of a printing machine is a printing roller. This drive roller 32 is mounted between two shoulders 34 of a carriage 36. The lower ends of the shoulders 34 are supported by two brackets 38 each of which is vertically displaceable in a guide (not shown) carried by the respective support 26.

The two brackets 38 and with them the drive roller 32 and trolley 36 are lifted towards the pressure roller 30 by means of vertical screws 40 engaging respective captive nuts in the brackets 38. Each screw 40 is connected, through a first speed reduction gear 42, a horizontal transmission shaft 44 and a second speed reduction gear 46 to a lower drive flange 48 on the shaft of the motor 10.

The two shoulders 34 have two abuttments 50 at their upper end which are adapted to come into contact with two microswitches 52 mounted on lateral supports 54 of the roller 30 when the rollers 30 and 32 come to a predetermined relative position. The switches 52 are connected to an electric circuit (not shown), the structure of which can well be understood by those skilled in the art, for causing a changeover from the motor to the motor 16 of each device 22 when the switches 52 are operated.

The twin motor devices 24 of the invention are electrically interconnected to ensure synchronous lifting movement of the two devices. During the first lifting stage at a fast speed the motor 10 is excited and rotates at a high rotational speed, pulling the stepping motor 16. When the two abutments 50 formed by the upper ends of the two shoulders 34 come into contact with respective microswitches 52 mounted on lateral supports 54 of the roller 30, the excitation of the motor 10 is discontinued and the stepping motor 16 is excited so that the motor 10, which previously pulled the motor 16, which brakes rapidly due to the permanent magnets of the motor 16, and continues to rotate at a low rotational speed, with high torque, stopping the lifting movement at a predetermined point which corresponds to a required pressure between rollers 30 and 32. Since the stepping motor 16 rotates with an almost total absence of inertia the final stopping of the motor 16 is immediate, substantially without shock and at a precise point.

Rotation is imparted to the drive roller 32 through a cardan shaft 56 from a transmission gearbox 58 fixed to an auxiliary support 60. The transmission gearbox 58 is connected to the corresponding transmission gearboxes 58 of other stages of the machine 26 by means of a transmission shaft 62 driven by a single electric motor.

Figure 3:
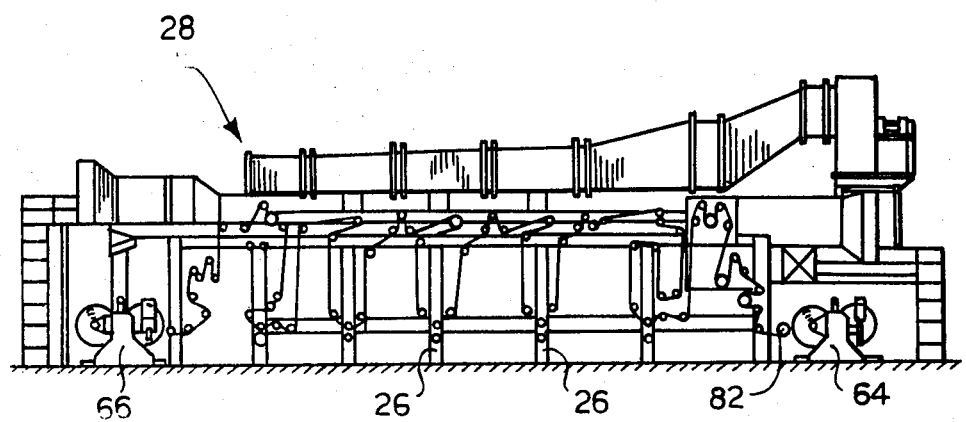
FIG. 3 is a schematic side view of a printing machine incorporating a winding and unwinding unit provided with devices according to this invention.

In FIG. 3 a printing machine with five printing roller stages is illustrated. The machine has in the leading stage a web unwinding unit 64 and, in the final stage a web winding unit 66.

Figure 4:
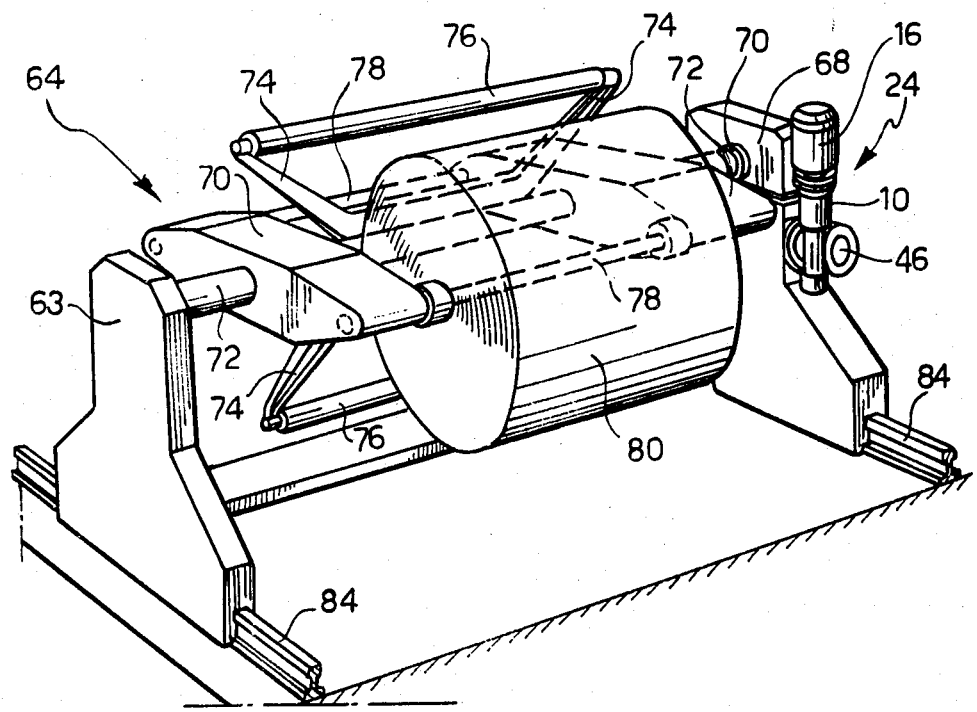
FIG. 4 is a schematic perspective view of an enlarged scale of the unwinding unit employed in the machine of FIG. 3.

The unwinding unit 64 is similar to the winding unit 66 and is illustrated in further detail in FIG. 4. The unwinding unit 64 has two lateral supports 68 supporting a rotary shaft 72 on which two yokes 70 are fixed.

Between the yokes 70 there are mounted two bars 78 each forming the core of a roll 80 of a wound web. When the roll 80 is rotated by means of a motor (not shown) the web unwinds from the roll 80 and is fed into the machine 28 to be printed.

During the unwinding of a roll 80 a new roll 80 can be loaded between the opposite ends of the yokes 70. When the first roll 80 is exhausted the two yokes 70 are made to rotate through 180° around the shaft 72 so as to bring the new roll 80 into the place previously occupied by the exhausted roll, and vice-versa. Such rotation is imparted to the shaft 72 through the twin motor devices 24 and one or more speed reducers fixed to one of the two supports 68. Also in this case an initial fast rotation is commutated to a slow rotation with gentle and rapid braking, followed by an immediate and precise shock-free stopping.

The two motors 10 and 16 operate as earlier described to drive the winding unit 66 for the printed web, situated at the final stage of the machine 28.

During the feeding of the web from the respective roll 80 in the unwinding unit 64 of the machine 28 and during the feeding of the printed web from the machine 28 to a respective roll 80 on the winding unit 66, a pressure roller 82 is kept pressed against the winding or unwinding roll 80 respectively, thus avoiding creases or waviness in the web. Upon variation of the thickness of the web on the roll 80 the unwinding unit 64 or the winding unit 66 must be displaced against the pressure roller 82 to maintain contact between the latter and the roll 80.

To perform such displacement of the unwinding unit 64 and of the winding unit 66 mounted on the rails 84, a drive device 24 comprising a pair of motors 10 and 16 is employed, in accordance with the invention.

This invention can be applied not only to printing machines but also to web coating or painting machines, machines which distribute liquids, pastes, powders or machines for treating webs of any material such as embossing or cutting machines, or die-cutting machines, or indeed any machines where a relatively fast movement has to be commuted to a relatively slow movement, with positive shock-free braking and with gentle and precise stopping at a predetermined position.

It will be understood that while still keeping to the principle of this invention, manufacturing details of practical embodiments can be varied widely with respect to what has been described and illustrated by way of example, without departing from the scope of the present invention.

I claim:

1. A device for controlling displacement of a drive roller into and out of engagement with a counter-roller including a driven movable member supporting said drive roller, a fixed member supporting said counter-roller, a high speed electric motor having a driving shaft operatively connected to said driven movable member, a low speed electric motor comprised of a permanent magnet stepping motor having a shaft aligned with the shaft of said high speed motor, coupling means for interconnecting the shafts of the high speed motor and the low speed motor, said high speed motor and said low speed motor being selectively operable for causing sequentially a high speed movement and a low speed movement of said driven movable member toward said fixed member and switch means operatively associated with said fixed and movable members for causing a changeover from said high speed motor to said low speed motor as said drive roller approaches said counter-roller whereby said permanent magnet stepping motor will drive said drive roller into engagement with said counter-roller without shock.

2. A device as set forth in claim 1, wherein the high speed electric motor is a direct current motor.

3. A device as set forth in claim 1, wherein the high speed electric motor is an alternating current motor.

* * * * *